(12) United States Patent
Tseng et al.

(10) Patent No.: US 11,456,590 B2
(45) Date of Patent: Sep. 27, 2022

(54) SHORT CIRCUIT DETECTION MODULE AND SHORT CIRCUIT DETECTION METHOD APPLIED THERETO

(71) Applicant: Cheng Uei Precision Industry Co., Ltd., New Taipei (TW)

(72) Inventors: Chin Huang Tseng, New Taipei (TW); Wen Bing Hsu, New Taipei (TW); Hui Lin Lai, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 420 days.

(21) Appl. No.: 16/856,355

(22) Filed: Apr. 23, 2020

(65) Prior Publication Data

US 2020/0373751 A1    Nov. 26, 2020

Related U.S. Application Data

(60) Provisional application No. 62/852,323, filed on May 24, 2019.

(30) Foreign Application Priority Data

Oct. 18, 2019  (TW) .................................. 108137623

(51) Int. Cl.
*H02H 5/04* (2006.01)
*H02H 3/087* (2006.01)
(Continued)

(52) U.S. Cl.
CPC ............. *H02H 5/047* (2013.01); *A24F 40/53* (2020.01); *H02H 1/0007* (2013.01); *H02H 3/087* (2013.01)

(58) Field of Classification Search
CPC .. H02J 7/0029; H02J 7/00302; H02J 7/00304; H02J 7/00306; H02J 7/00308;
(Continued)

(56) References Cited

U.S. PATENT DOCUMENTS 9,872,519 B2    1/2018  Xiang
2015/0043117 A1*  2/2015  Xiang .................... A24F 40/90
361/91.5

(Continued)

FOREIGN PATENT DOCUMENTS

TW    201916820 A    5/2019
WO    2017020220 A1   2/2017

OTHER PUBLICATIONS

Taiwan Patent Office, Search Report and Office Action, Patent Application No. TW108137623, dated Feb. 24, 2020.

*Primary Examiner* — Jared Fureman
*Assistant Examiner* — Christopher J Clark
(74) *Attorney, Agent, or Firm* — Lin & Associates Intellectual Property, Inc.

(57) ABSTRACT

A short circuit detection module includes a power unit including a battery for providing a voltage of the battery, a monitoring unit, a switch unit, a heating unit and a control unit. The monitoring unit is connected with the power unit. The switch unit includes a first MOSFET, the monitoring unit is connected with the source electrode of the first MOSFET. The heating unit is connected with the drain electrode of the first MOSFET, the drain electrode of the first MOSFET transmits a heating current to the heating unit. A heating voltage is generated at an output terminal of the short circuit detection module. The control unit is connected with and controls the power unit, the monitoring unit, the switch unit and the heating unit. When the heating voltage is greater than a critical value of the heating voltage, the control unit turns off the first MOSFET.

20 Claims, 7 Drawing Sheets

(51) Int. Cl.
*A24F 40/53* (2020.01)
*H02H 1/00* (2006.01)

(58) Field of Classification Search
CPC .. H02J 7/00309; A24F 40/50–57; H02H 5/04;
H02H 5/041; H02H 5/047; H02H 3/087
See application file for complete search history.

(56) References Cited

U.S. PATENT DOCUMENTS

| 2015/0189916 A1* | 7/2015 | Wu ........................ H05B 1/023 |
| | | 392/386 |
| 2019/0200675 A1* | 7/2019 | Bache ..................... A24F 40/53 |
| 2020/0260791 A1* | 8/2020 | Lee ......................... A24F 40/51 |
| 2020/0281276 A1* | 9/2020 | Akao ..................... H02J 7/005 |

* cited by examiner

TABLE I

| V_BAT(V) | Pulse Width Frequency Value(Hz) |
|---|---|
| 3.0 | 111 |
| 3.3 | 560 |
| 3.6 | 871 |

FIG. 7

SHORT CIRCUIT DETECTION MODULE AND SHORT CIRCUIT DETECTION METHOD APPLIED THERETO

CROSS-REFERENCE TO RELATED APPLICATION

This application claims the priorities of U.S. provisional patent application No. 62/852,323, filed on May 24, 2019 and Taiwan patent application no. 108137623, filed on Oct. 18, 2019, which are incorporated herewith by reference.

BACKGROUND OF THE INVENTION

1. Field of the Invention

The present invention generally relates to a short circuit detection module and a short circuit detection method applied thereto, and more particularly to a short circuit detection module applied to an electronic device, and a short circuit detection method applied thereto for maintaining a constant temperature of the electronic device.

2. The Related Art

Traditionally, a conventional electronic device is supplied electricity by a battery. The conventional electronic device uses a voltage provided by the battery to heat an object. With electricity of the battery being dropped, the voltage provided by the battery will be also dropped that causes a heating effect to be lowered and causes temperature of the conventional electronic device to have no way of being controlled constant.

The conventional electronic device probably adjusts the temperature automatically by way of maintaining a constant voltage or a constant current, whereas, an effect stability of adjusting the temperature is poor.

However, if the conventional electronic device has no temperature adjusting measure, the object will be heated overly at the time of the temperature of the conventional electronic device being overly high, and simultaneously an energy is wasted.

Thus, an innovative short circuit detection module applied to an electronic device, and an innovative short circuit detection method applied to the innovative short circuit detection module of the electronic device are essential to be provided for maintaining a constant temperature of the electronic device and effectively preventing a short circuit phenomenon from being caused, so that the constant heating temperature of the electronic device is maintained under a condition of a voltage of a battery being changed, and heating quality of the electronic device is improved.

SUMMARY OF THE INVENTION

An object of the present invention is to provide a short circuit detection module applied to an electronic device. The short circuit detection module includes a power unit including a battery for providing a voltage of the battery, a monitoring unit, a switch unit, a heating unit and a control unit. The monitoring unit is connected with the power unit. The voltage of the battery is inputted into the monitoring unit, and correspondingly a heating current is transmitted to the monitoring unit. The monitoring unit receives the voltage of the battery. The switch unit includes a first MOSFET (Metal-Oxide-Semiconductor Field Effect Transistor), the monitoring unit is connected with and coupled with the source electrode of the first MOSFET. The heating unit is connected with and coupled with the drain electrode of the first MOSFET, the drain electrode of the first MOSFET transmits the heating current to the heating unit, and the heating unit receives the corresponding heating current. A heating voltage is generated at an output terminal of the short circuit detection module. The control unit is connected with and controls the power unit, the monitoring unit, the switch unit and the heating unit, the control unit is connected with and coupled with the gate electrode of the first MOSFET. The control unit adjusts the heating current and the heating voltage to maintain a constant heating voltage by virtue of the control unit outputting PWM (Pulse-Width Modulation) signals to the first MOSFET according to different voltages of the battery. When the heating current becomes larger, the heating voltage correspondingly becomes larger, and when the heating voltage is greater than a critical value of the heating voltage, the control unit controls the monitoring unit to judge that the short circuit detection module has a short circuit phenomenon, and the control unit turns off the first MOSFET.

Another object of the present invention is to provide a short circuit detection module applied to an electronic device. The short circuit detection module includes a power unit including a battery for providing a voltage of the battery, a monitoring unit, a switch unit, a heating unit and a control unit. The monitoring unit is connected with the power unit. The voltage of the battery is inputted into the monitoring unit, and correspondingly a heating current is transmitted to the monitoring unit, the monitoring unit receives the voltage of the battery. The switch unit includes a first MOSFET (Metal-Oxide-Semiconductor Field Effect Transistor), the monitoring unit is connected with and coupled with the source electrode of the first MOSFET. The heating unit is connected with and coupled with the drain electrode of the first MOSFET, the drain electrode of the first MOSFET transmits the heating current to the heating unit, and the heating unit receives the corresponding heating current, a heating voltage is generated at an output terminal of the short circuit detection module. The control unit is connected with and controls the power unit, the monitoring unit, the switch unit and the heating unit. The control unit is connected with and coupled with the gate electrode of the first MOSFET, the control unit includes a PWM (Pulse-Width Modulation) module and a second MOSFET, the drain electrode of the second MOSFET is connected with the gate electrode of the first MOSFET, the control unit adjusts the heating current and the heating voltage to maintain a constant heating voltage by virtue of the PWM module outputting PWM signals to the second MOSFET and the first MOSFET according to different voltages of the battery. When the heating current becomes larger, the heating voltage correspondingly becomes larger, and when the heating voltage is greater than a critical value of the heating voltage, the control unit controls the monitoring unit to judge that the short circuit detection module has a short circuit phenomenon, and the control unit turns off the second MOSFET and the first MOSFET.

Another object of the present invention is to provide a short circuit detection method applied to a short circuit detection module of an electronic device. The short circuit detection module includes a first MOSFET, and a control unit connected with the first MOSFET. Specific steps of the short circuit detection method are described hereinafter. Read a voltage of a battery. Get a pulse width frequency value of turning on the first MOSFET according to the voltage of the battery, and transmit the pulse width frequency value to the first MOSFET, and then execute a next step. Heat the electronic device by a heating voltage of the battery generated at an output terminal of the short circuit detection module. Read the heating voltage. Judge whether the heating voltage is greater than a critical value by the control unit, when the heating voltage is greater than the critical value, a short circuit is shown to be happened, execute a next step to proceed with a short circuit protection, if the short circuit is without being happened, repeat executing the step of reading the voltage of the battery. Turn off the first MOSFET to proceed with the short circuit protection, after the short circuit protection is proceeded, execute a next step. Stop heating the electronic device.

As described above, in processes of repeating the above-mentioned steps, when the heating temperature rises and the heating current becomes larger, the heating current is decreased by use of modulating the pulse width frequency values to make the heating temperature decreased automatically and maintaining a better heating quality effect, and a usage safety of a user who uses the electronic device is ensured, the short circuit detection module, and the short circuit detection method applied to the short circuit detection module are provided for maintaining the constant temperature of the electronic device and effectively preventing the short circuit phenomenon from being caused, so that the constant heating temperature of the electronic device is maintained under a condition of the voltage of the battery being changed, and the heating quality of the electronic device is improved.

BRIEF DESCRIPTION OF THE DRAWINGS

The present invention will be apparent to those skilled in the art by reading the following description, with reference to the attached drawings, in which:

FIG. 7 is a table showing that voltages of a battery, and pulse width frequency values of the short circuit detection module of the electronic device in accordance with the preferred embodiment of the present invention.

DETAILED DESCRIPTION OF THE PREFERRED EMBODIMENT

Figure 1:
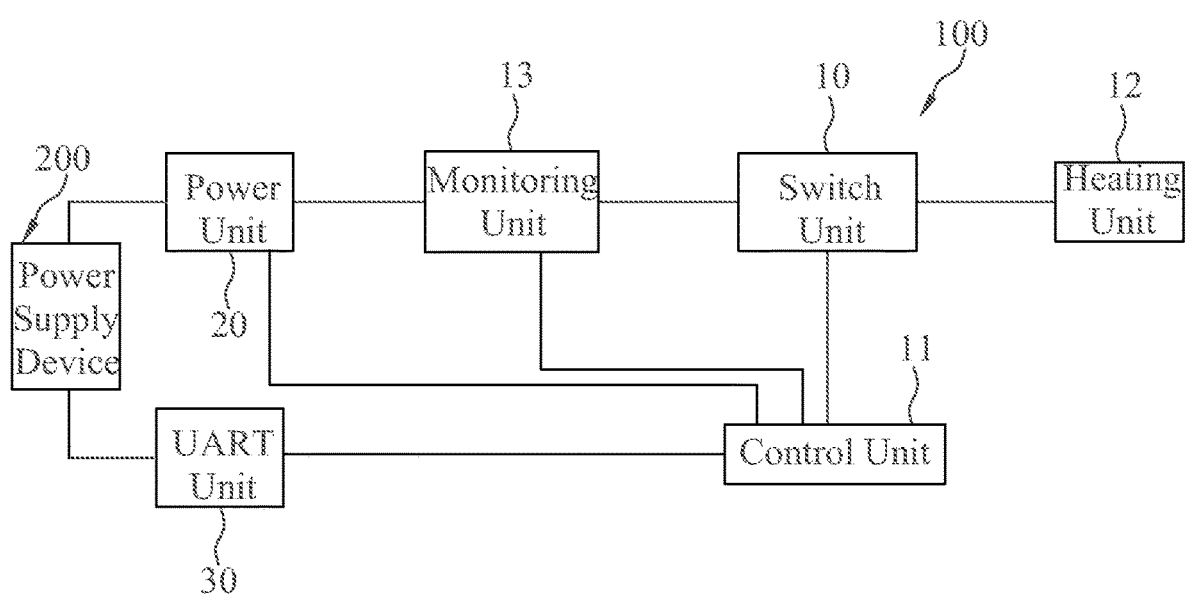
FIG. 1 is a block diagram of a short circuit detection module in accordance with a preferred embodiment of the present invention, wherein the short circuit detection module is applied to an electronic device and is charged by a power supply device.

With reference to FIG. 1 to FIG. 4, a short circuit detection module 1 applied to an electronic device 100, and a short circuit detection method applied to the short circuit detection module 1 of the electronic device 100 in accordance with a preferred embodiment of the present invention are shown. The electronic device 100 is adapted for being charged by a power supply device 200 and has a UART (Universal Asynchronous Receiver/Transmitter) function. The short circuit detection module 1 includes a switch unit 10 which includes a first MOSFET (Metal-Oxide-Semiconductor Field Effect Transistor) Q4, a control unit 11, a heating unit 12, a monitoring unit 13, and a power unit 20 for providing an electricity. The control unit 11 is connected with and controls the power unit 20, the monitoring unit 13, the switch unit 10 and the heating unit 12.

Figure 2:
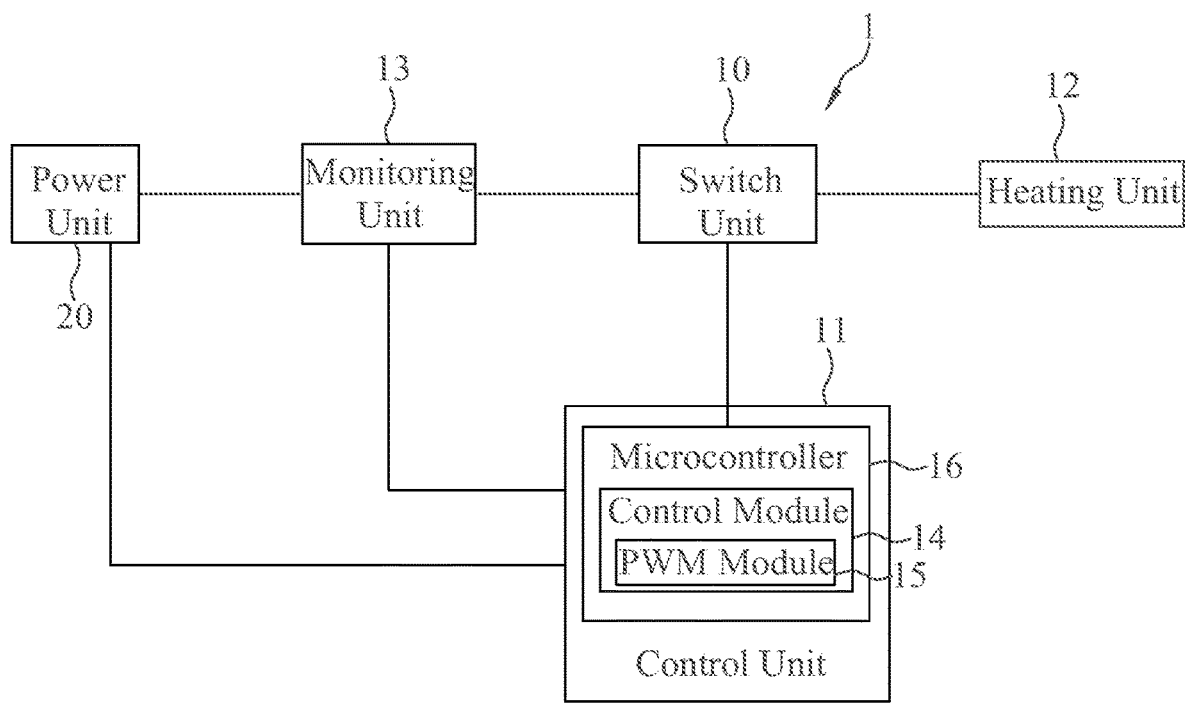
FIG. 2 is a block diagram of the short circuit detection module in accordance with the preferred embodiment of the present invention, wherein the short circuit detection module is applied to the electronic device.
Figure 3:
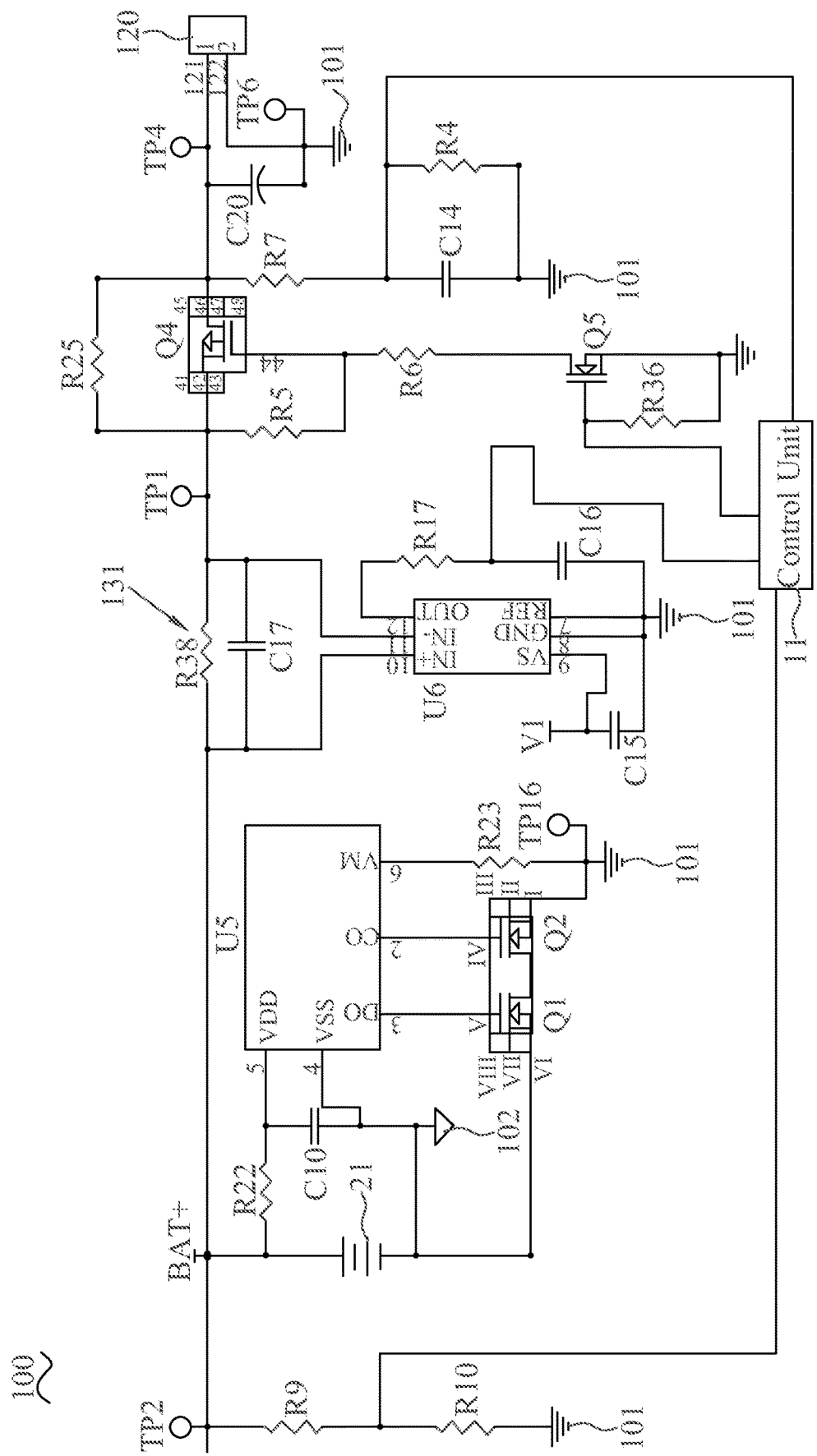
FIG. 3 is a circuit diagram of the short circuit detection module in accordance with the preferred embodiment of the present invention, wherein the short circuit detection module is applied to the electronic device.
Figure 4:
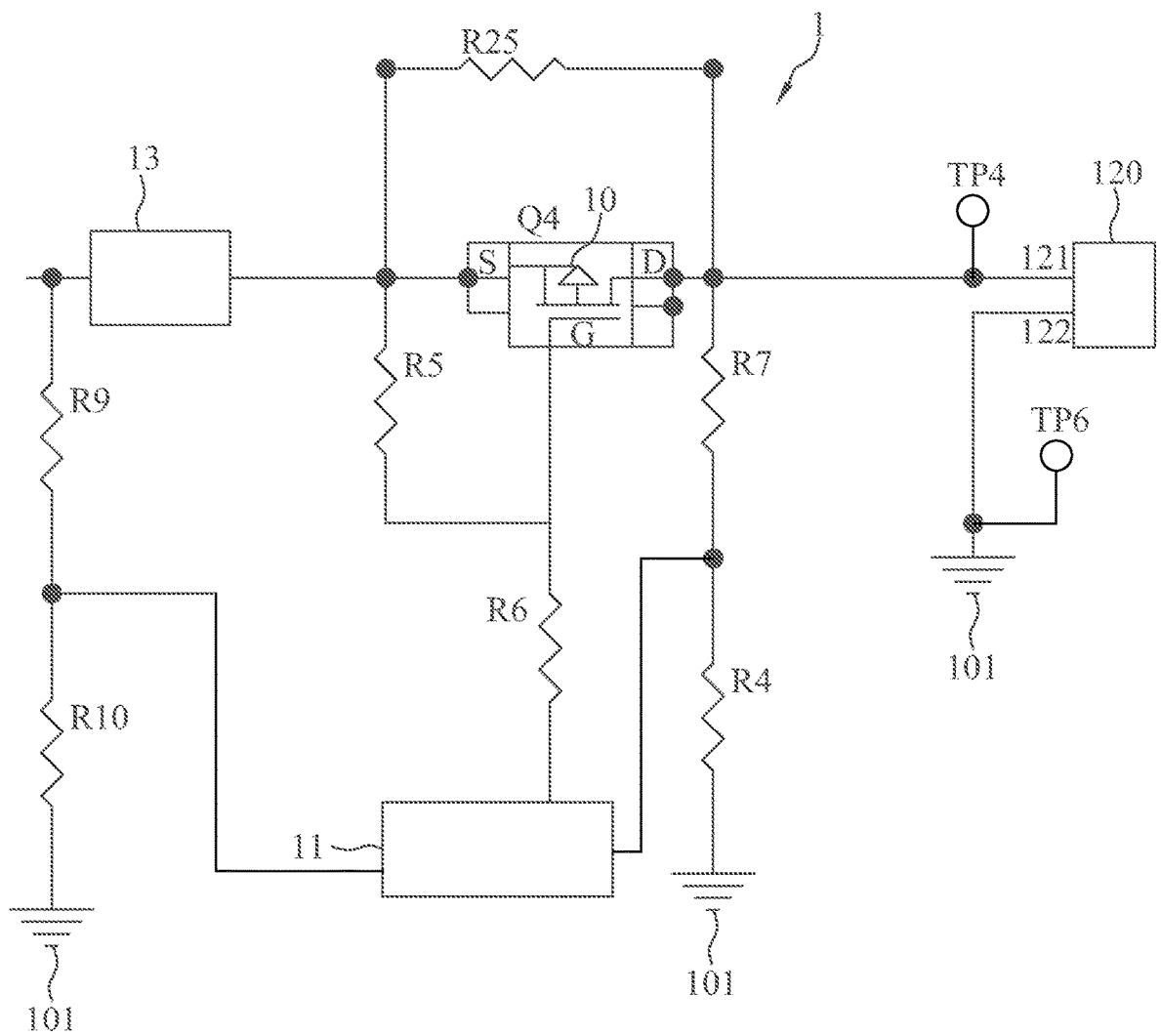
FIG. 4 is a partial circuit diagram of the short circuit detection module of FIG. 1.

Referring to FIG. 1 to FIG. 4 again, the control unit 11 includes a control module 14 including a microcontroller 16 and a second MOSFET Q5. The control unit 11 is connected with the first MOSFET Q4. The microcontroller 16 includes a PWM (Pulse-Width Modulation) module 15 and a UART unit 30. When the power unit 20 is electrically connected with the power supply device 200, the power unit 20 of the electronic device 100 is charged by the power supply device 200, and the electronic device 100 is communicated with the power supply device 200 by the UART unit 30. The UART function of the electronic device 100 is used for a production test mode of a production test system (not shown), a health record mode of a health record system (not shown) and other applications. The electronic device 100 is switched at any time to be used in the UART function, a use efficiency of the electronic device 100 is increased. At the moment, the electricity is provided for the electronic device 100 applying the short circuit detection module 1 by the power unit 20. The microcontroller 16 of the control unit 11 is connected with the switch unit 10.

The power unit 20 includes a battery 21 for providing a voltage of the battery 21 (V_BAT), a first resistance R9, a second resistance R10, a third resistance R22, a fourth resistance R23, a first capacitance C10, a protection component U5, a third MOSFET Q1 and a fourth MOSFET Q2.

A positive pole of the battery 21 is connected with a positive voltage pin VDD of the protection component U5 through the third resistance R22. A negative pole of the battery 21 is connected with a negative voltage pin VSS of the protection component U5, and the negative pole of the battery 21 and the negative voltage pin VSS of the protection component U5 are connected with a reference low potential position 102. The negative pole of the battery 21 is connected with the third MOSFET Q1. The drain electrode of the third MOSFET Q1 and the drain electrode of the fourth MOSFET Q2 are connected with each other. The fourth MOSFET Q2 is connected with a detection pin VM of the protection component U5 through the fourth resistance R23. A junction between the fourth resistance R23 and the fourth MOSFET Q2 is defined as a first testing point TP16, and the junction between the fourth resistance R23 and the fourth MOSFET Q2 is connected with ground 101. The gate electrode of the third MOSFET Q1 is connected with a discharging control pin DO of the protection component U5 for realizing an overly discharging protection function of the electronic device 100. The gate electrode of the fourth MOSFET Q2 is connected with a charging control pin CO of the protection component U5 for realizing an overly charging protection function of the electronic device 100.

The first capacitance C10 is connected between the negative pole of the battery 21 and one end of the third resistance R22 which is connected with the positive voltage pin VDD of the protection component U5. The other end of the first resistance R9 is connected with a second testing point TP2.

And simultaneously, the first capacitance C10 is connected between the positive voltage pin VDD and the negative voltage pin VSS of the protection component U5. The first capacitance C10 is used for steadying the voltage of the battery 21 (V_BAT) of the power unit 20. The protection component U5 is used for an overly charging protection, an overly discharging protection and an overly current protection. One end of the first resistance R9 is connected with the second resistance R10, and the first resistance R9 and the second resistance R10 are connected with the voltage of the battery 21. The voltage of the battery 21 generates a divided voltage of the battery 21 between the first resistance R9 and the second resistance R10, and through the first resistance R9. The control module 14 of the control unit 11 is connected between the first resistance R9 and the second resistance R10 and controls the switch unit 10 according to the divided voltage of the battery 21.

The voltage of the battery 21 of the power unit 20 (V_BAT) is inputted into the monitoring unit 13, and correspondingly a heating current (I_HEAT) is transmitted to the monitoring unit 13. The monitoring unit 13 is connected with the power unit 20 and receives the voltage of the battery 21 of the power unit 20 (V_BAT).

The monitoring unit 13 includes a plurality of hardwares. The plurality of the hardwares 131 of the monitoring unit 13 include a fifth resistance R38, a sixth resistance R17, a second capacitance C15, a third capacitance C16, a fourth capacitance C17 and a monitoring chip U6. The fifth resistance R38 is connected with the battery 21. The fourth capacitance C17 is connected with two ends of the fifth resistance R38 for steadying the voltage of the battery 21 (V_BAT) of the power unit 20. The two ends of the fifth resistance R38 are connected with a positive input (IN+) pin and a negative input (IN−) pin of the monitoring chip U6. One end of the sixth resistance R17 is connected with an output pin (OUT) of the monitoring chip U6, and the other end of the sixth resistance R17 is connected with one end of the third capacitance C16. The other end of the third capacitance C16 is connected with the ground 101. One end of the second capacitance C15 is connected with a reference voltage V1, and the other end of the second capacitance C15 is connected with the ground 101. A grounding (GND) pin and a reference (REF) pin of the monitoring chip U6 are connected with the ground 101. A voltage source (VS) pin of the monitoring chip U6 is connected between the second capacitance C15 and the reference voltage V1. The monitoring unit 13 judges whether a short circuit phenomenon is happened by a firmware program and the plurality of the hardwares 131 of the monitoring unit 13. The control module 14 of the control unit 11 is connected between the sixth resistance R17 and the third capacitance C16. The control module 14 of the control unit 11 controls the switch unit 10 according to monitoring information outputted from the monitoring chip U6 and outputted between the sixth resistance R17 and the third capacitance C16. In the preferred embodiment, the reference voltage V1 is 3.3V.

Referring to FIG. 1 to FIG. 4, preferably, the first MOSFET Q4 of the switch unit 10 is a P-type MOSFET. The monitoring unit 13 is connected with the switch unit 10. The monitoring unit 13 is connected with and coupled with the source electrode of the first MOSFET Q4 of the switch unit 10. The source electrode of the first MOSFET Q4 receives the heating current, and the drain electrode of the first MOSFET Q4 transmits the heating current to the heating unit 12.

The switch unit 10 includes a seventh resistance R25, an eighth resistance R5, a ninth resistance R7 and the first MOSFET Q4. The fifth resistance R38 is connected with the first MOSFET Q4. One end of the fifth resistance R38 is connected with the source electrode of the first MOSFET Q4. The other end of the fifth resistance R38 is connected with the battery 21. The short circuit detection module 1 further includes a third testing point TP1 connected between the one end of the fifth resistance R38 and the source electrode of the first MOSFET Q4. Two ends of the seventh resistance R25 are connected with the source electrode and the drain electrode of the first MOSFET Q4. One end of the eighth resistance R5 is connected with the gate electrode of the first MOSFET Q4. The other end of the eighth resistance R5 is connected with the source electrode of the first MOSFET Q4 and one end of the seventh resistance R25. One end of the ninth resistance R7 is connected with the drain electrode of the first MOSFET Q4 and the other end of the seventh resistance R25. The short circuit detection module 1 further includes a twelfth resistance R4 and a fifth capacitance C14. The other end of the ninth resistance R7 is connected with one end of the fifth capacitance C14 and one end of the twelfth resistance R4. The other end of the twelfth resistance R4 is connected with the other end of the fifth capacitance C14. The other end of the twelfth resistance R4 and the other end of the fifth capacitance C14 are connected with the ground 101. An output voltage, namely a heating voltage is generated at an output terminal of the short circuit detection module 1 and between the ninth resistance R7 and the twelfth resistance R4. The control module 14 of the control unit 11 is connected with the heating voltage outputted between the ninth resistance R7 and the twelfth resistance R4. The control module 14 of the control unit 11 controls the second MOSFET Q5 according to the heating voltage. The fifth capacitance C14 is used for steadying the output voltage, namely the heating voltage of the short circuit detection module 1.

The short circuit detection module 1 further includes a tenth resistance R6. The drain electrode of the second MOSFET Q5 is connected with the gate electrode of the first MOSFET Q4 through the tenth resistance R6. The control unit 11 is connected with and coupled with the gate electrode of the first MOSFET Q4 of the switch unit 10 through the tenth resistance R6. The control unit 11 adjusts the heating current and the heating voltage to maintain a constant heating voltage by virtue of the PWM module 15 of the control unit 11 outputting PWM signals to the second MOSFET Q5 and the first MOSFET Q4 according to different voltages of the battery 21. One end of the tenth resistance R6 is connected with the gate electrode of the first MOSFET Q4 and the one end of the eighth resistance R5. The other end of the tenth resistance R6 is connected with the drain electrode of the second MOSFET Q5. The source electrode of the second MOSFET Q5 is connected with the ground 101. The control unit 11 includes an eleventh resistance R36. The eleventh resistance R36 is connected between the gate electrode of the second MOSFET Q5 and the ground 101. The control module 14 is connected between the gate electrode of the second MOSFET Q5 and the eleventh resistance R36. When the control unit 11 controls the second MOSFET Q5 and the first MOSFET Q4 to be turned on, the control unit 11 transmits a PWM signal to the second MOSFET Q5 to control the second MOSFET Q5 so as to control the switch unit 10. The control unit 11 transmits the PWM signal to the first MOSFET Q4 of the switch unit 10. The control unit 11 transmits a pulse width frequency value to the second MOSFET Q5 and the first MOSFET Q4 according to the voltage of the battery.

The switch unit 10 is connected with the heating unit 12. The heating unit 12 is connected with and coupled with the drain electrode of the first MOSFET Q4 of the switch unit 10, and the heating unit 12 receives the corresponding heating current through the seventh resistance R25 and the eighth resistance R5.

In addition, the electronic device 100 generally uses a pulse width modulation control circuit of the PWM module 15 of the microcontroller 16 of the control module 14 of the control unit 11 to output the PWM signals to the second MOSFET Q5, and the first MOSFET Q4 of the switch unit 10 to adjust the output voltage, namely the heating voltage (V_HEAT) of the short circuit detection module 1.

The source electrode of the first MOSFET Q4 of the switch unit 10 is connected with the heating voltage (V_HEAT) through the ninth resistance R7 and the seventh resistance R25. The drain electrode of the first MOSFET Q4 of the switch unit 10 is connected with the heating voltage (V_HEAT) through the ninth resistance R7. The twelfth resistance R4 is connected between the heating voltage (V_HEAT) and the ground 101.

The heating unit 12 includes a sixth capacitance C20, and a heating element 120 for heating an object (not shown). The heating element 120 has a first pin 121 and a second pin 122. The sixth capacitance C20 is connected with the first pin 121 and the second pin 122 of the heating element 120. The sixth capacitance C20 and the heating element 120 are connected with the ground 101. The heating unit 12 of the short circuit detection module 1 has a fourth testing point TP4 and a fifth testing point TP6. The fourth testing point TP4 is disposed between one end of the sixth capacitance C20 and the first pin 121. The fifth testing point TP6 is disposed between the other end of the sixth capacitance C20 and the second pin 122. The fifth testing point TP6, the sixth capacitance C20 and the second pin 122 are connected with the ground 101. The drain electrode of the first MOSFET Q4 of the switch unit 10 is connected with the first pin 121 of the heating unit 12 and the one end of the sixth capacitance C20. The fifth testing point TP6 is adjacent to the ground 101.

Referring to FIG. 1 to FIG. 7, in the preferred embodiment, when the battery 21 of the power unit 20 has the different voltages, the control unit 11 transmits different pulse width frequency values of turning on the second MOSFET Q5 and the first MOSFET Q4 shown in TABLE I of FIG. 7 to the second MOSFET Q5 and the first MOSFET Q4 according to the different voltages of the battery 21 of the power unit 20 (V_BAT). Specifically, when the voltage of the battery 21 of the power unit 20 is 3.0V, the pulse width frequency value is 111 Hz. When the voltage of the battery 21 of the power unit 20 is 3.3V, the pulse width frequency value is 560 Hz. When the voltage of the battery 21 of the power unit 20 is 3.6V, the pulse width frequency value is 871 Hz. The control unit 11 modulates the pulse width frequency values of turning on the second MOSFET Q5 and the first MOSFET Q4 by the PWM (Pulse-Width Modulation) module 15.

When at least one of the divided voltage of the battery 21, the heating voltage (V_HEAT) of the short circuit detection module 1 and the heating current which is got from the monitoring information outputted from the monitoring chip U6 becomes larger, the control unit 11 adjusts the pulse width frequency values outputting to the gate electrode of the second MOSFET Q5, and the gate electrode of the first MOSFET Q4 of the switch unit 10 to make the pulse width frequency values outputting to the second MOSFET Q5 and the first MOSFET Q4 become smaller so as to lower the heating current (I_HEAT).

In the preferred embodiment, each voltage of the battery 21 of the power unit 20 (V_BAT) is read through the firmware program which is in the monitoring unit 13. And according to the voltage of the battery 21 of the power unit 20 (V_BAT), the control unit 11 will transmit the pulse width frequency values corresponding to the voltages of the battery 21 of the power unit 20 (V_BAT), specifically, when the voltage of the battery 21 of the power unit 20 (V_BAT) is 3.0V, the control unit 11 will transmit the pulse width frequency value which is 111 Hz, so a purpose of utilizing the stable voltage of the battery 21 of the power unit 20 (V_BAT) to maintain heating quality of the electronic device 100 is reached.

At the moment, the monitoring unit 13 monitors a heating temperature of the heating unit 12 through the heating current (I_HEAT). When the heating temperature of the heating unit 12 rises, the heating current (I_HEAT) becomes larger, the pulse width frequency value of turning on the second MOSFET Q5 and the first MOSFET Q4 of the switch unit 10 are modulated to make a pulse width of turning on the second MOSFET Q5 and the first MOSFET Q4 narrowed down so as to lower the heating current (I_HEAT), and correspondingly the heating temperature falls automatically and simultaneously the heating quality of the electronic device 100 is maintained.

Similarly, when the heating current (I_HEAT) becomes larger, the heating voltage (V_HEAT) correspondingly becomes larger, and when the heating voltage (V_HEAT) is overly greater and is greater than a critical value, in the preferred embodiment, the critical value of the heating voltage (V_HEAT) is approximately 1.0V, the critical value of the heating voltage (V_HEAT) which is approximately 1.0V is just used to be illustrated, and is without being used to limit the present invention, the control unit 11 controls the firmware program of the monitoring unit 13 to judge that the short circuit phenomenon is produced at an output terminal of the short circuit detection module 1 where the heating voltage (V_HEAT) is generated, and the control unit 11 turns off the second MOSFET Q5, and the first MOSFET Q4 of the switch unit 10 for preventing the heating voltage (V_HEAT) from continuing being led to the object which is disposed to and heated by the heating unit 12 of the electronic device 100 so as to proceed with a short circuit protection.

For example, an initial voltage of of the battery 21 of the power unit 20 (V_BAT) providing the electricity for the short circuit detection module 1 of the electronic device 100 is 3.6V, and the heating current flows through the first resistance R9 and the second resistance R10 to the monitoring unit 13. The source electrode of the first MOSFET Q4 of the switch unit 10 which is the P-type MOSFET receives the heating current from the monitoring unit 13, the heating unit 12 receives the heating current discharged from the drain electrode of the first MOSFET Q4 of the switch unit 10 through the seventh resistance R25 and the eighth resistance R5. The heating voltage (V_HEAT) is generated through the ninth resistance R7 and the twelfth resistance R4, and, simultaneously, the gate electrode of the first MOSFET Q4 of the switch unit 10 will discharge the heating current to the control unit 11 through the tenth resistance R6.

According to the TABLE I shown in FIG. 7, the control unit 11 transmits the different pulse width frequency values of turning on the second MOSFET Q5 and the first MOSFET Q4 of the switch unit 10 according to the different voltages of the battery 21 of the power unit 20, namely each voltage of the battery 21 of the power unit 20 (V_BAT) is corresponding to one pulse width frequency value. When the voltage of the battery 21 of the power unit 20 is 3.6V, the pulse width frequency value is 871 Hz. The voltage of the battery 21 which is 3.6V is defined as V1_BAT, and the pulse width frequency value which is 871 Hz is defined as PWM1, and correspondingly the heating voltage is defined as a first heating voltage (V1_HEAT), and the heating current is defined as a first heating current (I1_HEAT). With time of the power unit 20 which is used in the electronic device 100 being increased, the electricity of the power unit 20 becomes weaker, the voltage of the battery 21 of the power unit 20 is weakened to 3.3V, and the voltage of the battery 21 of the power unit 20 which is 3.3V is defined as V2_BAT, at the moment, the pulse width frequency value corresponding to the V2_BAT is 560 Hz, and the pulse width frequency value which is 560 Hz is defined as PWM2, and simultaneously, the heating voltage is changed from the first heating voltage V1_HEAT into a second heating voltage V2_HEAT, and the first heating current (I1_HEAT) flowing into the heating unit 12 of the electronic device 100 is changed into a second heating current (I2_HEAT).

In the same way, when the voltage of the battery 21 is changed to 3.0V, and the voltage of the battery 21 which is 3.0V is defined as V3_BAT, the pulse width frequency value is changed to 111 Hz, and the pulse width frequency value which is 111 Hz is expressed as PWM3, simultaneously, the heating voltage is changed into a third heating voltage (V3_HEAT), and the heating current is changed into a third heating current (I3_HEAT). The heating current is one of the first heating current, the second heating current, the third heating current.

In a process of using the electronic device 100, the voltage of the battery 21 of the power unit 20 (V_BAT) will be gradually decreased to make a heating effect weakened.

In the above-mentioned description, V1_BAT is greater than V2_BAT, and V2_BAT is greater than V3_BAT, so V1_BAT>V2_BAT1>V3_BAT. The heating temperature of the heating unit 12 of the electronic device 100 corresponding to the V_BAT is expressed as T. The heating temperature of the heating unit 12 corresponding to the V1_BAT is expressed as T1. The heating temperature of the heating unit 12 corresponding to the V2_BAT is expressed as T2. The heating temperature of the heating unit 12 corresponding to the V3_BAT is expressed as T3. T1 is greater than T2, and T2 is greater than T3, so T1>T2>T3. The first heating current (I1_HEAT) is greater than the second heating current (I2_HEAT), and the second heating current (I2_HEAT) is greater than the third heating current (I3_HEAT), so I1_HEAT>I2_HEAT>I3_HEAT. The PWM1 which is 871 Hz is greater than the PWM2 which is 560 Hz, and the PWM2 which is 560 Hz is greater than the PWM3 which is 111 Hz, so PWM1>PWM2>PWM3. When the heating temperature of the heating unit 12 rises, the heating current flowing into the heating unit 12 becomes larger.

According to a relation between the pulse width frequency value and the heating current, the control unit 11 controls the monitoring unit 13, at this time, the monitoring chip U6 of the monitoring unit 13 is a current monitor, the pulse width frequency values outputted by the switch unit 10 is modulated according to the different voltages of the battery 21 of the power unit 20 (V_BAT) monitored by the monitoring unit 13, namely, the different pulse width frequency values provided for the heating unit 12 according to the different voltages of the battery 21 of the power unit 20 (V_BAT) to make the electronic device 100 reach the stable heating voltage and heating current.

In addition, when the heating voltage (V_HEAT) exceeds the critical value of the heating voltage (V_HEAT) which is approximately 1.0V, the firmware program of the monitoring unit 13 will judge that the output terminal of the short circuit detection module 1 where the heating voltage (V_HEAT) is generated has a short circuit phenomenon, and the control unit 11 turns off the second MOSFET Q5, and the first MOSFET Q4 of the switch unit 10 to make the voltage of the battery 21 of the power unit 20 (V_BAT) have no way of being transmitted to the object which need be heated so as to reach an output short circuit protection effect of the short circuit detection module 1.

Figure 5:
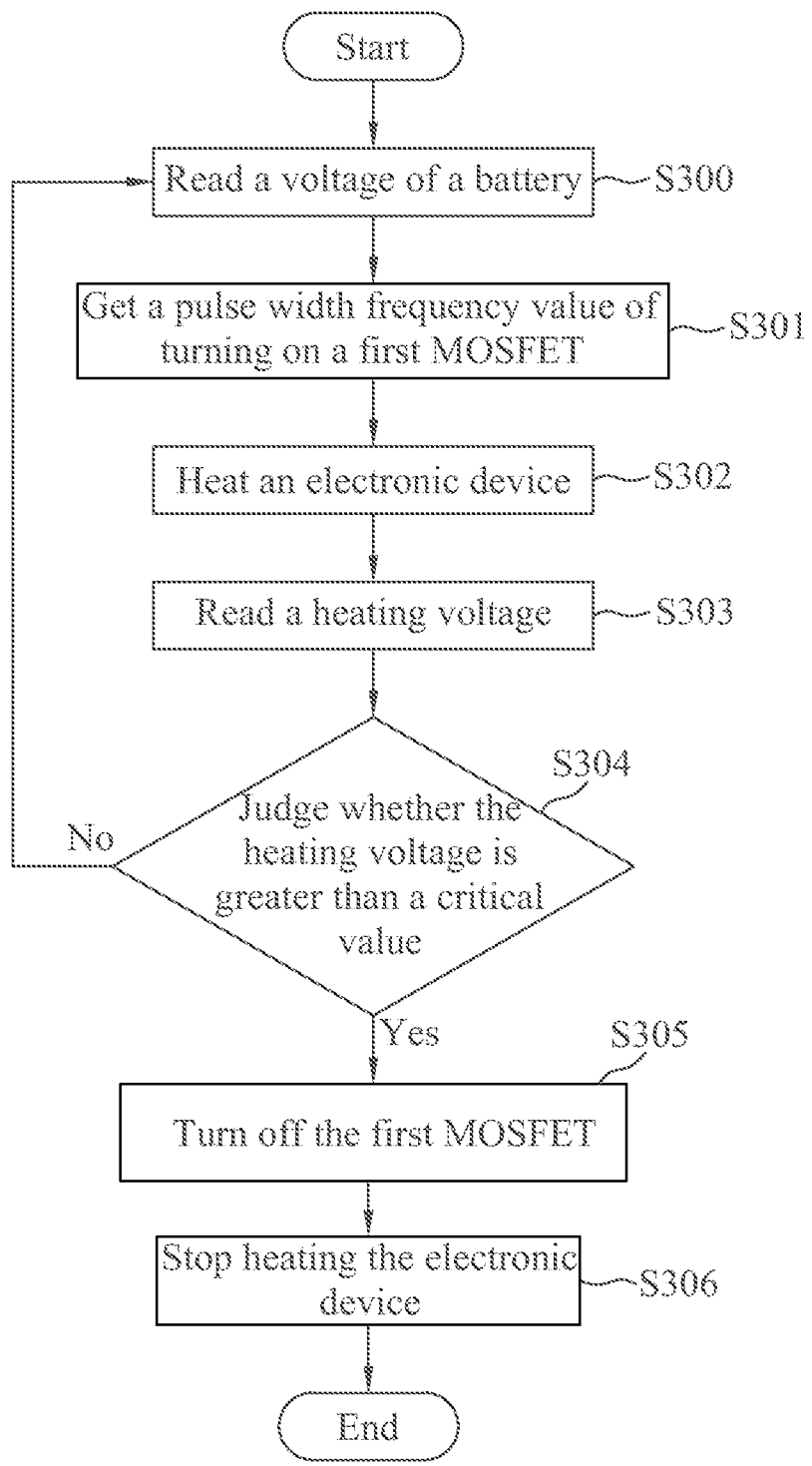
FIG. 5 is a flow chart of a short circuit detection method in accordance with the preferred embodiment of the present invention, wherein the short circuit detection method is applied to the short circuit detection module of the electronic device.

Referring to FIG. 1 to FIG. 7, a flow chart of the short circuit detection method applied to the short circuit detection module 1 of the electronic device 100 is shown in FIG. 5. Specific steps of the short circuit detection method include steps 300-305. Descriptions of the short circuit detection method are as follows.

Step S300: read the voltage of the battery 21 of the power unit 20 (V_BAT) provided for the electronic device 100, the electronic device 100 generally modulates the output voltage, namely the heating voltage by use of the PWM signal outputted from a pulse width modulation control circuit of the PWM module 15 of the microcontroller 16 of the control unit 11, so execute step S301.

Step S301: get the pulse width frequency value of turning on the second MOSFET Q5 and the first MOSFET Q4 according to the voltage of the battery 21 of the power unit 20 (V_BAT) of the TABLE I shown in FIG. 7, and transmit the pulse width frequency value to the second MOSFET Q5 and the first MOSFET Q4, and then execute a next step S302.

Step S302: heat the electronic device 100 and the object in the electronic device 100 by the heating voltage, the electricity of the battery 21 of the power unit 20 is gradually declined with heating the object, the voltage of the battery 21 of the power unit 20 is also declined, and correspondingly, the heating voltage is changed, the heating temperature of the electronic device 100 rises, a temperature of the object heated by the electronic device 100 also rises, so execute step S303.

Step S303: read the heating voltage for confirming whether the second MOSFET Q5 and the first MOSFET Q4 are turned on or turned off, at the moment, execute step S304.

Step S304: judge whether the heating voltage is greater than the critical value by the control unit 11, when the heating voltage is greater than the critical value which is approximately 1.0V, a short circuit is shown to be happened, if the short circuit is happened, execute a next step S305 described in the above-mentioned preferred embodiment to proceed with the short circuit protection, when the heating voltage is less than the critical value, the short circuit is without being happened, if the short circuit is without being happened, repeat executing the step S300 of reading the voltage of the battery 21 of the power unit 20 (V_BAT). The critical value is just used for being illustrated and is without being used to limit the present invention.

Step S305: turn off the second MOSFET Q5, and the first MOSFET Q4 of the switch unit 10 for preventing the voltage of battery 21 of the power unit 20 from being led to the object which is heated by the heating unit 12 so as to proceed with the short circuit protection, after the short circuit protection is proceeded, execute a next step S306.

Step S306: stop heating the electronic device 100 and the object, that is to say, turn off the second MOSFET Q5 and the first MOSFET Q4, simultaneously, in application devices of some other preferred embodiments are also able to display LED warning light signals.

When the heating voltage is judged to be greater than the critical value by the control unit 11, the control unit 11 controls the first MOSFET Q4 and the second MOSFET Q5 to be turned off.

Figure 6:
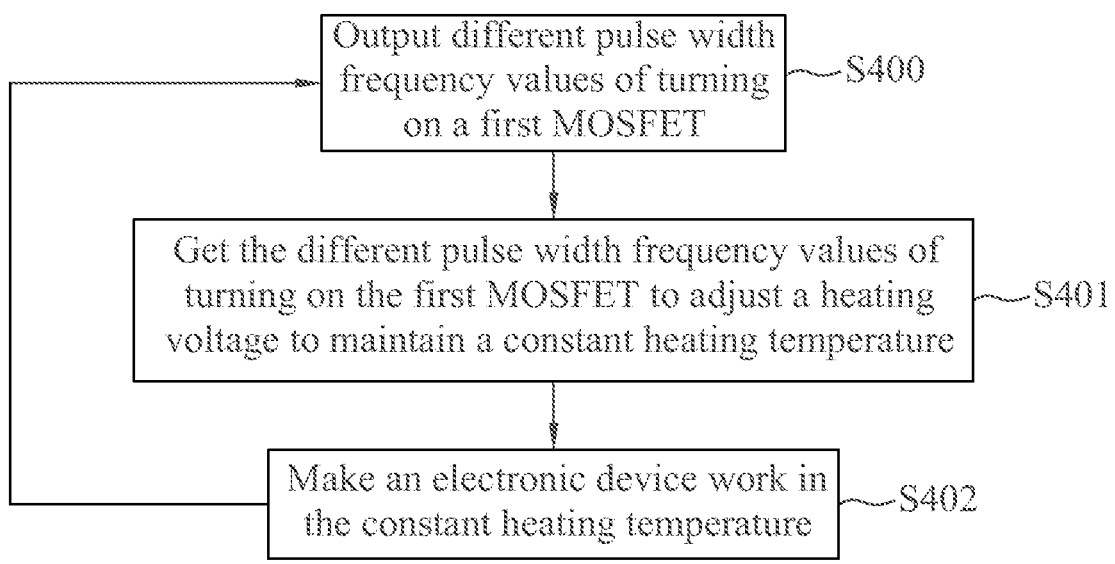
FIG. 6 is a flow chart of a constant temperature control method in accordance with the preferred embodiment of the present invention, wherein the constant temperature control method is applied to the short circuit detection method of the short circuit detection module of the electronic device.

Referring to FIG. 1 to FIG. 7 again, the short circuit detection method further includes a constant temperature control method. a flow chart of the constant temperature control method applied in the short circuit detection method of the electronic device 100 in accordance with the preferred embodiment of the present invention is shown in FIG. 6. Specific steps of the constant temperature control method include steps S400-S402 which are described as follows.

Steps S400-S402 shown in FIG. 6 are corresponding to the steps S300-S302 shown in FIG. 5, the steps S400-S402 are used for making the firmware program of the monitoring unit 13 read the voltage of the battery 21 of the power unit 20 (V_BAT), the control unit 11 is used for modulating the pulse width frequency values outputting to the second MOSFET Q5, and the first MOSFET Q4 of the switch unit 10 so as to reach outputting the constant heating voltage and make the heated object which is heated by the constant heating voltage of the electronic device 100 have a constant temperature effect, so following steps of the short circuit detection and the short circuit protection shown in FIG. 5 are without being executed in the steps S400-S402.

When the constant temperature control method is applied to the preferred embodiment of the present invention, the battery 21 of the power unit 20 provides the electricity for the electronic device 100 which includes the short circuit detection module 1.

Step S400: read the voltage of the battery 21 of the power unit 20 (V_BAT). An initial voltage of the battery 21 of the power unit 20 (V_BAT) is V0_BAT. The electronic device 100 generally uses the PWM circuit of the PWM module 15 of the microcontroller 16 of the control unit 11 to output the different pulse width frequency values of turning on the first MOSFET Q4 and the second MOSFET Q5 according to the different voltages of the battery 21 to the second MOSFET Q5 and the first MOSFET Q4 by the control unit 11 to adjust the output voltage, namely the heating voltage (V_HEAT), at the moment, an initial heating voltage (V0_HEAT) is corresponding to the initial voltage of the battery 21 of the power unit 20 (V0_BAT), and then proceed with the step S401.

Step S401: get the different pulse width frequency values of turning on the second MOSFET Q5 and the first MOSFET Q4 corresponding to the different voltages of the battery 21 of the power unit 20 (V_BAT) and according to the TABLE I to adjust the heating voltage to maintain a constant heating temperature of the electronic device 100, when the voltage of the battery 21 of the power unit 20 (V_BAT) is 3.6V, the pulse width frequency value is 871 Hz, and then proceed with the step S402.

Step S402: make the electronic device 100 work in the constant heating temperature, heat the electronic device 100 and the object, the electricity of the battery 21 of the power unit 20 is gradually lowered with heating the electronic device 100, so the voltage of the battery 21 of the power unit 20 is also lowered, at the moment, repeat executing the step S400. When the voltage of the battery 21 of the power unit 20 is changed to 3.3V which is V2_BAT, the pulse width frequency value PWM2 which is corresponding to the V2_BAT is got through the step S401, and the PWM2 is 560 Hz, simultaneously, the heating voltage corresponding to the PWM2 is changed into V2_HEAT, and the heating current is changed into the I2_HEAT.

In the same way, when the voltage of the battery 21 of the power unit 20 is lowered again, execute the step S400 again. When the voltage of the battery 21 of the power unit 20 is changed into the V3_BAT which is 3.0 V, the corresponding pulse width frequency value is changed into the PWM3 which is 111 Hz through the step S401.

As described above, in processes of repeating the above-mentioned steps, when the heating temperature rises and the heating current becomes larger, the heating current is decreased by use of modulating the pulse width frequency values to make the heating temperature decreased automatically and maintaining a better heating quality effect, and a usage safety of a user who uses the electronic device 100 is ensured, the short circuit detection module 1, and the short circuit detection method applied to the short circuit detection module 1 are provided for maintaining the constant temperature of the electronic device 100 and effectively preventing the short circuit phenomenon from being caused, so that the constant heating temperature of the electronic device 100 is maintained under a condition of the voltage of the battery 21 being changed, and the heating quality of the electronic device 100 is improved.

The short circuit detection module and the short circuit detection method provided by the present invention will read the voltages of the battery 21 of the power unit 20 through the firmware program, simultaneously, contrast the voltage of the battery 21 of the power unit 20 (V_BAT) with the pulse width frequency value for reaching the constant temperature effect in a heating process, so that a better feeling experience is provided for the user who uses the electronic device 100, and judge whether the short circuit is happened through detecting the heating voltage corresponding to the heating temperature to proceed with the short circuit protection for protecting a safety of the user.

It is obvious for a person who has a common knowledge in a related technology field, under a condition of being without breaking away from a spirit of the present invention, the present invention may be executed in another specific form, so the above-mentioned description is without being ought to be interpreted as a limitation meaning in all aspects, whereas, the above-mentioned description should be interpreted as an illustrative characteristic.

A scope of the present invention should be confirmed through a reasonable interpretation of the attached scope of the patent application, and all changes in an equivalent scope of the present invention are all included in the scope of the present invention.

What is claimed is:

1. A short circuit detection module applied to an electronic device, the short circuit detection module comprising:
   a power unit including a battery for providing a voltage of the battery;
   a monitoring unit connected with the power unit, the voltage of the battery being inputted into the monitoring unit, and correspondingly a heating current being transmitted to the monitoring unit, the monitoring unit receiving the voltage of the battery;
   a switch unit including a first MOSFET (Metal-Oxide-Semiconductor Field Effect Transistor), the monitoring unit being connected with and coupled with the source electrode of the first MOSFET;
   a heating unit connected with and coupled with the drain electrode of the first MOSFET, the drain electrode of the first MOSFET transmitting the heating current to the heating unit, and the heating unit receiving the corresponding heating current, a heating voltage being generated at an output terminal of the short circuit detection module; and a control unit connected with and controlling the power unit, the monitoring unit, the switch unit and the heating unit, the control unit being connected with and coupled with the gate electrode of the first MOSFET, the control unit adjusting the heating current and the heating voltage to maintain a constant heating voltage by virtue of the control unit outputting PWM (Pulse-Width Modulation) signals to the first MOSFET according to different voltages of the battery, wherein when the heating current becomes larger, the heating voltage correspondingly becomes larger, and when the heating voltage is greater than a critical value of the heating voltage, the control unit controls the monitoring unit to judge that the short circuit detection module has a short circuit phenomenon, and the control unit turns off the first MOSFET.

2. The short circuit detection module as claimed in claim 1, wherein when the battery of the power unit has the different voltages, the control unit transmits different pulse width frequency values of turning on the first MOSFET to the first MOSFET according to the different voltages of the battery of power unit.

3. The short circuit detection module as claimed in claim 1, wherein the short circuit detection module further includes a tenth resistance, the control unit includes a control module including a microcontroller connected with the switch unit, a second MOSFET, and an eleventh resistance connected between the gate electrode of the second MOSFET and ground, the drain electrode of the second MOSFET is connected with the gate electrode of the first MOSFET through the tenth resistance, the microcontroller includes a PWM module and a UART (Universal Asynchronous Receiver/Transmitter) unit, the control unit adjusts the heating current and the heating voltage to maintain the constant heating voltage by virtue of the PWM module outputting the PWM signals to the second MOSFET and the first MOSFET according to the different voltages of the battery, and when the heating voltage is greater than the critical value of the heating voltage, the control unit turns off the second MOSFET and the first MOSFET, when the power unit is electrically connected with a power supply device, the power unit is charged by the power supply device, and the electronic device is communicated with the power supply device by the UART unit.

4. A short circuit detection module applied to an electronic device, the short circuit detection module comprising:

a power unit including a battery for providing a voltage of the battery;

a monitoring unit connected with the power unit, the voltage of the battery being inputted into the monitoring unit, and correspondingly a heating current being transmitted to the monitoring unit, the monitoring unit receiving the voltage of the battery;

a switch unit including a first MOSFET (Metal-Oxide-Semiconductor Field Effect Transistor), the monitoring unit being connected with and coupled with the source electrode of the first MOSFET;

a heating unit connected with and coupled with the drain electrode of the first MOSFET, the drain electrode of the first MOSFET transmitting the heating current to the heating unit, and the heating unit receiving the corresponding heating current, a heating voltage being generated at an output terminal of the short circuit detection module; and a control unit connected with and controlling the power unit, the monitoring unit, the switch unit and the heating unit, the control unit being connected with and coupled with the gate electrode of the first MOSFET, the control unit including a PWM (Pulse-Width Modulation) module and a second MOSFET, the drain electrode of the second MOSFET being connected with the gate electrode of the first MOSFET, the control unit adjusting the heating current and the heating voltage to maintain a constant heating voltage by virtue of the PWM module outputting PWM signals to the second MOSFET and the first MOSFET according to different voltages of the battery, wherein when the heating current becomes larger, the heating voltage correspondingly becomes larger, and when the heating voltage is greater than a critical value of the heating voltage, the control unit controls the monitoring unit to judge that the short circuit detection module has a short circuit phenomenon, and the control unit turns off the second MOSFET and the first MOSFET.

5. The short circuit detection module as claimed in claim 4, wherein the control unit transmits different pulse width frequency values of turning on the second MOSFET and the first MOSFET to the second MOSFET and the first MOSFET according to the different voltages of the battery of power unit.

6. The short circuit detection module as claimed in claim 4, wherein the power unit includes a first resistance, a second resistance, a third resistance and a protection component, a positive pole of the battery is connected with a positive voltage pin of the protection component through the third resistance, a negative pole of the battery is connected with a negative voltage pin of the protection component and a reference low potential position, the protection component is used for an overly charging protection, an overly discharging protection and an overly current protection, one end of the first resistance is connected with the second resistance, and the first resistance and the second resistance are connected with the voltage of the battery, the voltage of the battery is inputted into the monitoring unit.

7. The short circuit detection module as claimed in claim 6, wherein the voltage of the battery generates a divided voltage of the battery between the first resistance and the second resistance, the control unit is connected between the first resistance and the second resistance, and controls the switch unit according to the divided voltage of the battery.

8. The short circuit detection module as claimed in claim 6, wherein the power unit includes a fourth resistance and a first capacitance, the first capacitance is connected between the negative pole of the battery and one end of the third resistance which is connected with the positive voltage pin of the protection component, and the first capacitance is connected between the positive voltage pin and the negative voltage pin of the protection component, the first capacitance is used for steadying the voltage of the battery.

9. The short circuit detection module as claimed in claim 8, wherein the power unit includes a third MOSFET and a fourth MOSFET, the negative pole of the battery is connected with the third MOSFET, the drain electrode of the third MOSFET and the drain electrode of the fourth MOSFET are connected with each other, the fourth MOSFET is connected with a detection pin of the protection component through the fourth resistance, a junction between the fourth resistance and the fourth MOSFET is connected ground, the gate electrode of the third MOSFET is connected with a discharging control pin of the protection component for realizing an overly discharging protection function of the electronic device, the gate electrode of the fourth MOSFET is connected with a charging control pin of the protection component for realizing an overly charging protection function of the electronic device.

10. The short circuit detection module as claimed in claim 4, wherein the monitoring unit includes a plurality of hardwares which include a fifth resistance, a second capacitance and a monitoring chip, one end of the fifth resistance is connected with the source electrode of the first MOSFET, the other end of the fifth resistance is connected with the battery, two ends of the fifth resistance are connected with a positive input pin and a negative input pin of the monitoring chip, one end of the second capacitance is connected with a reference voltage, and the other end of the second capacitance is connected with ground.

11. The short circuit detection module as claimed in claim 10, wherein the plurality of the hardwares of the monitoring unit include a sixth resistance and a third capacitance, one end of the sixth resistance is connected with an output pin of the monitoring chip, and the other end of the sixth resistance is connected with one end of the third capacitance, the other end of the third capacitance is connected with the ground, the control unit is connected between the sixth resistance and the third capacitance, the control unit controls the switch unit according to monitoring information outputted from the monitoring chip and outputted between the sixth resistance and the third capacitance.

12. The short circuit detection module as claimed in claim 10, wherein the plurality of the hardwares of the monitoring unit include a fourth capacitance, the fourth capacitance is connected with the two ends of the fifth resistance for steadying the voltage of the battery, a grounding pin and a reference pin of the monitoring chip are connected with the ground, a voltage source pin of the monitoring chip is connected between the second capacitance and the reference voltage, the monitoring unit judges whether the short circuit phenomenon is happened by a firmware program and the plurality of the hardwares of the monitoring unit.

13. The short circuit detection module as claimed in claim 4, wherein the switch unit includes a seventh resistance and an eighth resistance, two ends of the seventh resistance are connected with the source electrode and the drain electrode of the first MOSFET, one end of the eighth resistance is connected with the gate electrode of the first MOSFET, the other end of the eighth resistance is connected with the source electrode of the first MOSFET, and one end of the seventh resistance.

14. The short circuit detection module as claimed in claim 13, wherein the switch unit includes a ninth resistance, one end of the ninth resistance is connected with the drain electrode of the first MOSFET and the other end of the seventh resistance, the short circuit detection module further includes a twelfth resistance and a fifth capacitance, the other end of the ninth resistance is connected with one end of the fifth capacitance and one end of the twelfth resistance, the other end of the twelfth resistance is connected with the other end of the fifth capacitance, the other end of the twelfth resistance and the other end of the fifth capacitance are connected with ground, the heating voltage is generated between the ninth resistance and the twelfth resistance, the control unit includes a control module connected with the heating voltage outputted between the ninth resistance and the twelfth resistance, the control module controls the second MOSFET according to the heating voltage.

15. The short circuit detection module as claimed in claim 4, wherein the control unit includes a control module including a microcontroller connected with the switch unit, and an eleventh resistance connected between the gate electrode of the second MOSFET and ground, the short circuit detection module further includes a tenth resistance, the drain electrode of the second MOSFET is connected with the gate electrode of the first MOSFET through the tenth resistance, the microcontroller includes the PWM module and a UART (Universal Asynchronous Receiver/Transmitter) unit, when the power unit is electrically connected with a power supply device, the power unit is charged by the power supply device, and the electronic device is communicated with the power supply device by the UART unit.

16. The short circuit detection module as claimed in claim 4, wherein the heating unit includes a sixth capacitance and a heating element, the sixth capacitance is connected with the heating element, the sixth capacitance and the heating element are connected with ground.

17. A short circuit detection method applied to a short circuit detection module of an electronic device, the short circuit detection module including a first MOSFET, and a control unit connected with the first MOSFET, the short circuit detection method comprising steps of:
reading a voltage of a battery;
getting a pulse width frequency value of turning on the first MOSFET according to the voltage of the battery, and transmitting the pulse width frequency value to the first MOSFET, and then executing a next step;
heating the electronic device by a heating voltage of the battery generated at an output terminal of the short circuit detection module;
reading the heating voltage;
judging whether the heating voltage is greater than a critical value by the control unit, when the heating voltage is greater than the critical value, a short circuit being shown to be happened, executing a next step to proceed with a short circuit protection, if the short circuit is without being happened, repeating executing the step of reading the voltage of the battery;
turning off the first MOSFET to proceed with the short circuit protection, after the short circuit protection is proceeded, executing a next step; and
stopping heating the electronic device.

18. The short circuit detection method as claimed in claim 17, wherein the control unit includes a second MOSFET, the drain electrode of the second MOSFET is connected with the gate electrode of the first MOSFET, get the pulse width frequency value of turning on the second MOSFET and the first MOSFET according to the voltage of the battery, and transmit the pulse width frequency value to the second MOSFET and the first MOSFET, when the heating voltage is judged to be greater than the critical value by the control unit, the control unit controls the first MOSFET and the second MOSFET to be turned off.

19. The short circuit detection method as claimed in claim 17, further comprising a constant temperature control method, the constant temperature control method comprising steps of:
Step S400: reading the voltage of the battery, outputting the different pulse width frequency values of turning on the first MOSFET according to different voltages of the battery to the first MOSFET by the control unit;
Step S401: getting the different pulse width frequency values of turning on the first MOSFET to adjust the heating voltage to maintain a constant heating temperature of the electronic device; and
Step S402: making the electronic device work in the constant heating temperature, an electricity of the battery being gradually lowered with heating the electronic device, so the voltage of the battery being also lowered, at the moment, repeating executing the step S400.

20. The short circuit detection method as claimed in claim 19, wherein the control unit includes a second MOSFET, the drain electrode of the second MOSFET is connected with the gate electrode of the first MOSFET, get the different pulse width frequency values of turning on the second MOSFET and the first MOSFET corresponding to the different voltages of the battery.

\* \* \* \* \*